United States Patent [19]
Fell et al.

[11] Patent Number: 5,729,953
[45] Date of Patent: Mar. 24, 1998

[54] ROUND BALE WRAPPER DISPENSING APPARATUS

[75] Inventors: Ferol S. Fell, Newton; J. Dale Anderson, Canton; Melvin T. J. Weems, Peabody, all of Kans.

[73] Assignee: Hay & Forage Industries, Hesston, Kans.

[21] Appl. No.: 621,592

[22] Filed: Mar. 26, 1996

[51] Int. Cl.$^6$ .................................................. B65B 11/04
[52] U.S. Cl. ........................... 53/118; 53/587; 53/389.4; 53/389.5
[58] Field of Search ................... 53/211, 215, 118, 53/587, 556, 389.4, 389.5

[56] References Cited

U.S. PATENT DOCUMENTS

| | | |
|---|---|---|
| 5,090,182 | 2/1992 | Bethge . |
| 5,097,760 | 3/1992 | Ratzlaff et al. . |
| 5,129,207 | 7/1992 | Butler . |
| 5,129,208 | 7/1992 | Van Zee . |
| 5,216,873 | 6/1993 | Ratzlaff et al. . |

*Primary Examiner*—Linda Johnson
*Attorney, Agent, or Firm*—Hovey,Williams,Timmons & Collins

[57] ABSTRACT

The round baler has an improved feed device for feeding wrapper material from a reel of the material to the baling chamber, wherein the device includes a pair of feed rollers receiving the wrapper therebetween and drivable in directions to pull the wrapper from the reel for presentation to the chamber. A drive is coupled with the feed rollers for driving the rollers at velocities which pull the wrapper from the reel at a speed relatively less than the speed at which the wrapper is pulled from the reel by the bale forming mechanism during wrapping of the bale. The device also includes an overrunning clutch intercoupling the drive and the feed rollers. The clutch drivingly connects the feed rollers to the drive when engaged and drivingly disconnects the rollers from the drive when disengaged. The feed rollers are freely rotatable when the clutch is disengaged for allowing the wrapper to be pulled off the reel by the bale forming mechanism.

28 Claims, 3 Drawing Sheets

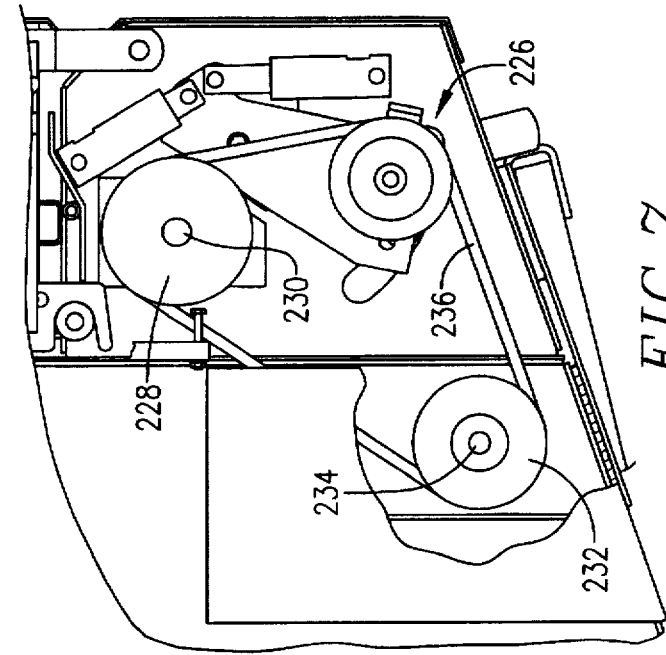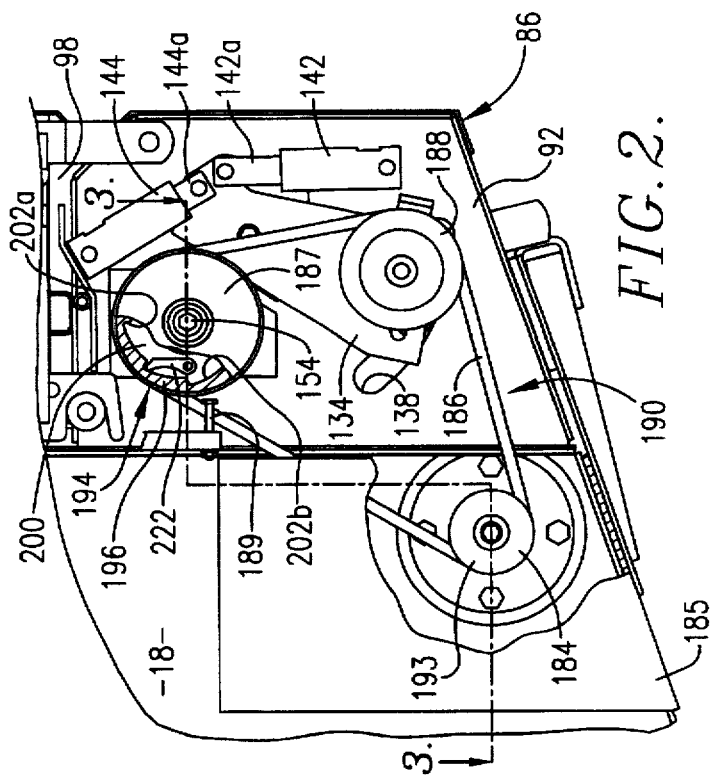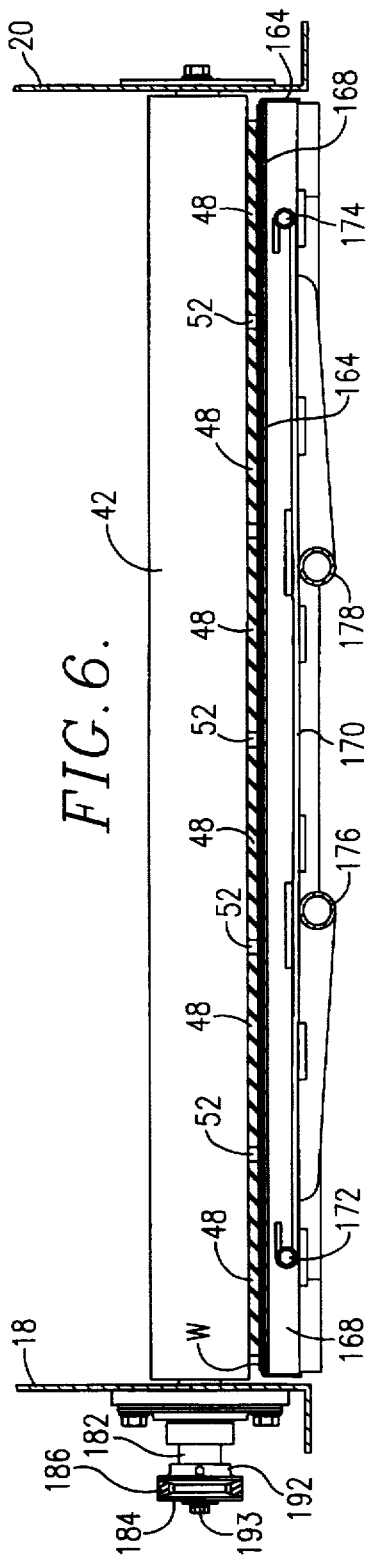

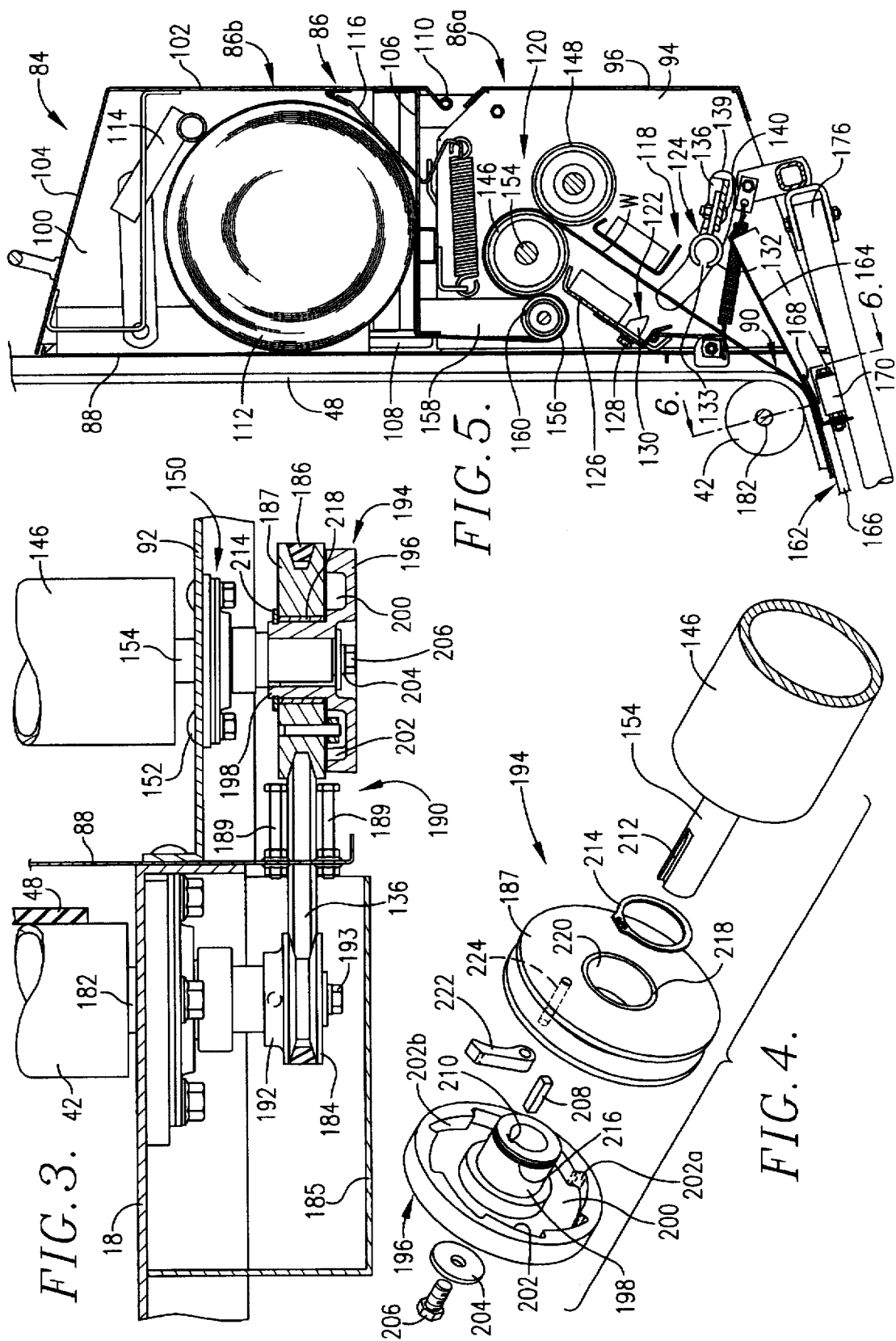

ROUND BALE WRAPPER DISPENSING APPARATUS

BACKGROUND OF THE INVENTION

1. Field of the Invention

The present invention relates generally to round balers utilizing lengths of wrapper material cut from a reel of the material for wrapping bales formed in the baling chamber and, more particularly, to an improved feed mechanism for feeding the wrapper material from the reel to the baling chamber.

2. Discussion of Prior Art

It is important that the web-type wrapper material utilized in wrapping the bales does not back-wrap onto the material feed rollers, which are positioned in downstream relation to the reel of wrapper material and are drivable in directions to pull the wrapper from the reel. Otherwise, the farmer must halt baling operations, climb down off the tractor, walk back to the baler, access the feed rollers and reel of material, perform the tedious task of removing the back-wrapped material from the feed rollers and replacing the free end of the reel of material between the rollers, and resume baling operations. Of course, such a situation is highly inconvenient for the farmer, wasteful of wrapper material, and time consuming. It has been determined that back-wrapping of the wrapper is typically, attributable to retardation of the wrapper as it is advanced by the bale forming mechanism from the feed rollers into the baling chamber. In other words, if the downstream bale forming mechanism advances the wrapper more slowly than the feed rollers pay it out to the mechanism, the wrapper has a tendency to bunch up immediately downstream from the feed rollers and eventually re-wrap (i.e., back-wrap) itself onto the feed rollers.

However, it is also important that the feed rollers pull the wrapper from the reel at the same speed at which the bale forming mechanism pulls the wrapper. If these speeds are not synchronized, the wrapper tends to stretch, which may result in splitting of the wrapper and incomplete wrapping of the bale along the width thereof. Accordingly, the problem of wrapper material back-wrapping onto the feed rollers cannot be resolved simply by reducing the speed of the rollers.

These problems are magnified in variable chamber balers, in which a series of belts and rolls are utilized to roll and form bales of hay. In variable chamber balers, the wrapper must travel several feet along a path extending from the feed rollers to the baling chamber. The belts are traditionally utilized to advance the wrapper along this path. In this respect, baler designs have drivingly coupled the forming rolls and feed rollers in an attempt to move the belts at the same speed as the speed at which the feed rollers pull the wrapper from the reel of material. However, the speed of the wrapper traveling along the path initially tends to be less than the speed at which it is pulled from the reel. This is due in part to the construction of conventional variable chamber balers. Particularly, the baler is provided with stationary structure disposed adjacent the belts for positioning the wrapper in engagement with the belts. The frictional engagement of the wrapper with the stationary surfaces of the structure prevents the wrapper from advancing along the path at the same speed as the belts. As those of ordinary skill in the an will appreciate, the speed of the wrapper along the path may depend on circumstances such as humidity, filth or burrs on the structure, etc. Accordingly, it is nearly impossible to coordinate the speeds of the belts and feed rollers so that each pulls the wrapper at the same speed. Furthermore, once the wrapper reaches the baling chamber, it is grasped aggressively between the bale and belts and pulled at speeds much closer to the speed of the moving belts, thus eliminating the effects of the frictional interengagement between the wrapper and stationary structure. Accordingly, in variable chamber balers there is a tendency for the belts to initially advance the wrapper along its path of movement at speeds less than the speed of the belts, but eventually advance the wrapper at speeds much closer to the belt speed.

OBJECTS AND SUMMARY OF THE INVENTION

Responsive to these problems, an important object of the present invention is to provide a wrapper material feed device which restricts back-wrapping of the material onto the feed rollers. Another important object of the present invention is to provide a feed device that prevents stretching of the wrapper as it wraps around the bale. Yet another object of the present invention is to provide a feed device that eliminates inconvenience to the farmer, time consumption and wasted material associated with conventional wrapper material feed devices. Finally, an object of the present invention is to provide a feed device that accommodates for the various speeds at which the belts in a variable chamber baler advance the wrapper during the wrapping cycle.

In accordance with these and other objects evident from the following description of a preferred embodiment of the invention, the round baler includes an improved feed device for feeding the wrapper from a reel of wrapper material to the baling chamber, wherein the device includes a pair of feed rollers receiving the wrapper therebetween and drivable in directions to pull the wrapper from the reel for presentation to the chamber. A drive is coupled with the feed rollers for driving the rollers at velocities which pull the wrapper from the reel at a speed relatively less than the speed at which the wrapper is pulled from the reel by the bale forming mechanism during wrapping of the bale. Finally, the device includes an overrunning clutch intercoupling the drive and the feed rollers. The clutch drivingly connects the feed rollers to the drive when engaged and drivingly disconnects the rollers from the drive when disengaged. Moreover, the feed rollers are freely rotatable when the clutch is disengaged for allowing the wrapper to be pulled off the reel by the bale forming mechanism.

Preferably, the drive includes a reducer assembly drivingly coupling the feed rollers with the bale forming mechanism. The reducer assembly consists of a drive sheave, a relatively larger driven sheave, and an endless belt which drivingly connects the driven sheave to the drive sheave when under tension. The drive sheave is coupled with the bale forming mechanism such that the drive sheave rotates during operation of the mechanism, while the driven sheave is coupled with the clutch.

The preferred clutch includes a ratchet wheel fixed to one of the feed rollers for rotational movement therewith, wherein the wheel has a plurality of circumferentially spaced grooves. Each of the grooves includes a locking surface and a camming surface. The clutch also includes a pawl supported on the driven sheave for pivotal movement into and out a drive position, in which the pawl abuttingly engages one of the locking surfaces for drivingly connecting the feed rollers and the drive. The feed rollers are drivingly disconnected from the drive when the pawl is out of its drive position. The camming surfaces of the grooves serve to successively pivot the pawl out of its drive position as the ratchet wheel rotates relatively faster than the driven sheave.

BRIEF DESCRIPTION OF THE DRAWINGS FIGURES

A preferred embodiment of the invention is described in detail below with reference to the attached drawing figures, wherein:

FIG. 2 is an enlarged, fragmentary, vertical cross-sectional view of a portion of the wrapping apparatus with the left sidewall of the housing removed to reveal internal details of construction, particularly illustrating the belt drive for coupling the feed rollers with the lower rear tailgate roll;

FIG. 3 is a fragmentary horizontal cross-sectional view taken along line 3—3 of FIG. 2, particularly illustrating the drive and the overrunning clutch intercoupling the drive and feed rollers;

FIG. 4 is an enlarged, exploded view of the overrunning clutch taken from within the baler, particularly illustrating how the clutch intercouples the feed rollers with the drive;

FIG. 5 is an enlarged, fragmentary, vertical cross-sectional view of the entire wrapping apparatus with the left sidewall of the housing removed to reveal internal details of construction, the apparatus being illustrated with the cutter tube in a retracted position and with wrapping material being paid out by the feed rollers;

Figure 1:
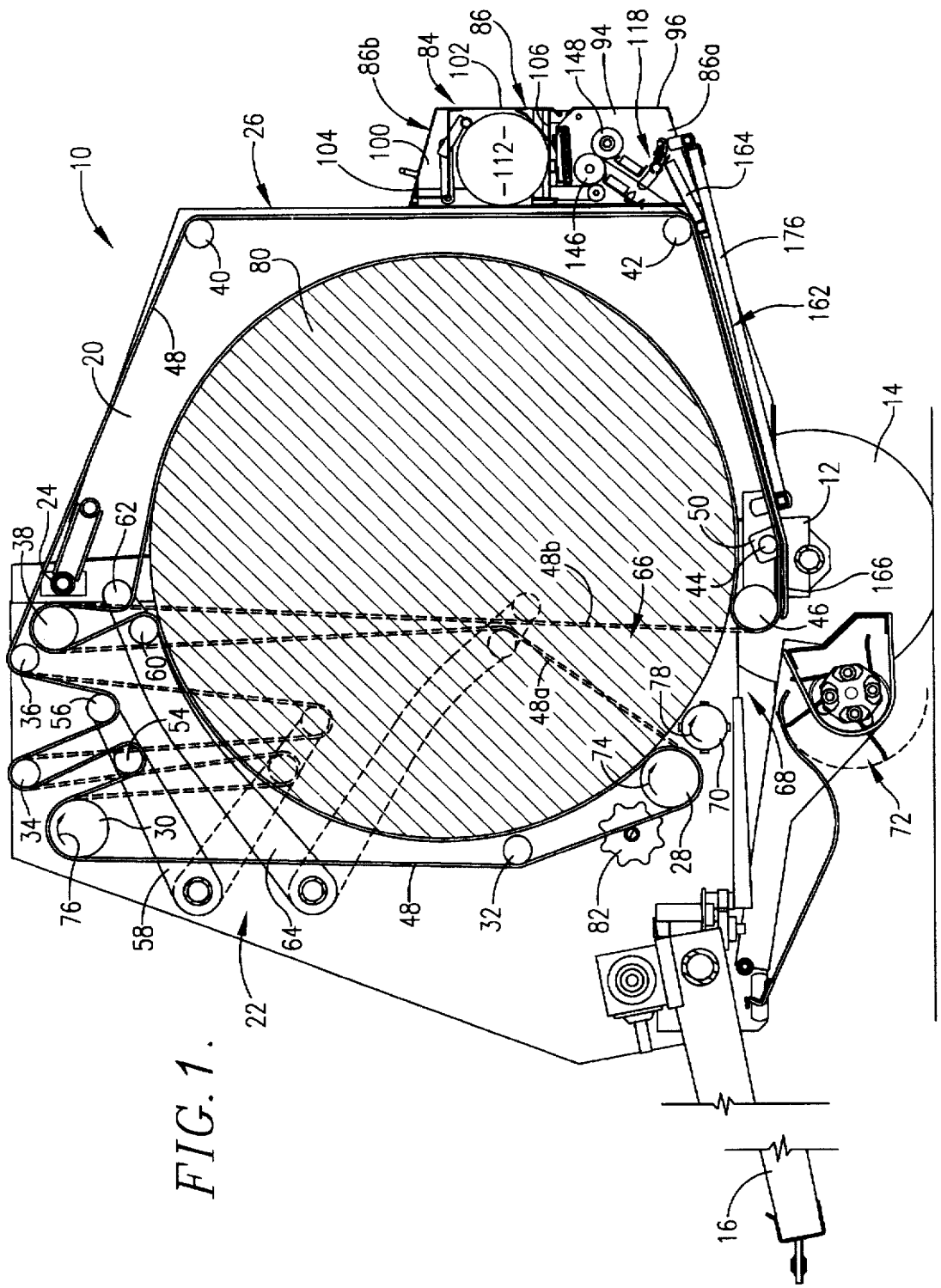
FIG. 1 is a fragmentary, side elevational view of a round baler with its left sidewall removed to reveal internal details of construction, such baler employing a wrapping apparatus in accordance with the present invention and showing in full lines a full size, ready-to-wrap bale within the baling chamber of the machine.

FIG. 6 is a fragmentary, generally vertical cross-sectional view taken along line 6—6 of FIG. 5, particularly illustrating the construction of the lower rear tailgate roll and the beginning of the path of the wrapper as is travels from the feed rollers to the baling chamber; and FIG. 7 is an enlarged, fragmentary, vertical cross-sectional view similar to FIG. 2, but illustrating; the prior art drive for drivingly coupling the feed rollers with the lower rear tailgate roll.

DETAILED DESCRIPTION OF THE PREFERRED EMBODIMENT

Turning now to FIG. 1, the round baler 10 selected for illustration generally includes a chassis 12 having ground wheels 14 and a forwardly extending tongue 16 that is adapted for connection with a towing vehicle (not shown). The chassis 12 carries a pair of upright, laterally spaced sidewalls 18 and 20 (see also FIG. 6) which cooperate to define a space within which bale forming and bale wrapping operations may be carried out as the baler is advanced across a field. Within the space defined by the sidewalls 18 and 20, the baler 10 further includes bale forming mechanism 22 for compacting and rolling crop material into a round bale.

The sidewalls 18,20 present stationary forward portions fixed to the chassis 12 by suitable means and rearward portions swingably attached to the forward portions by a pivot assembly 24. The rearward portions of the sidewalls 18,20 cooperatively define a tailgate 26 which is swingable between an open, discharge position (not shown), in which the tailgate 26 has sufficiently raised to allow a completely formed bale to be discharged from the baler 10, and a closed, baling position (FIG. 1), in which bale forming and wrapping operations are performed.

As previously mentioned, the sidewalls 18,20 cooperatively define a space within which bale forming and bale wrapping operations may be carried out. In the illustrated embodiment, the bale forming mechanism 22 and sidewalls 18,20 cooperate to define a so-called "variable chamber," belt-type machine, wherein the baling chamber is initially relatively small and then grows progressively larger as the bale increases in diameter within the baler 10. It will be appreciated, however, that the principles of the present invention are also applicable to a "fixed chamber" machine in which the dimensions of the baling chamber are at least substantially constant throughout the baling cycle, with the diameter of the chamber corresponding substantially with the diameter of the full size bale when completed.

With the forgoing caveat in mind, the bale forming mechanism 22 of the variable chamber baler illustrated herein include a series of cooperating belts and rolls supported by the sidewalls 18,20 for rolling and compacting a bale as it forms within the baler 10. Turning particularly to FIG. 1, the baler 10 is provided with a plurality of laterally extending, stationary rolls including a lower drive roll 28, upper drive roll 30, idler rolls 32,34,36,38,4,3,42, a trash clearing roll 44, and a support roll 46. The rolls 28–46 span the sidewalls 18,20 and are arranged in a generally circular pattern viewing FIG. 1 for guiding a plurality of endless, laterally spaced, side-by-side belts 48 as the belts 48 are driven linearly during bale formation and wrapping. Although not illustrated in detail, it will be appreciated that the trash clearing roll 44 includes a number of laterally spaced slats 50 received within the spaces 52 (see FIG. 6) defined between the belts 48 for clearing any trash which may become attached or adhered to the moving belts 48.

The bale forming mechanism further includes a pair of movable slack takeup rolls 54 and 56 mounted near the upper portion of the baler 10 on downwardly spring biased arm structure 58 to maintain tension on the belts 48, yet permit the paying out of stored slack as the bale increases in diameter during formation. Near the fore-and-aft center of the baler 10, the belts 48 are looped under the lower drive roll 28, over the upper idler roll 38, and under the support roll 46 to present a pair of opposed, front and rear runs 48a and 48b, which are initially generally upright, as illustrated in phantom in FIG. 1, but which become bowed out in fore-and-aft directions, as illustrated in solid lines, as the bale grows beyond its initial starting core dimensions. A pair of retaining rolls 60 and 62 are mounted on a second swingable arm structure 64 that is also spring biased downwardly to the phantom line position in FIG. 1; the retaining rolls 60,62 receiving the belt runs 48a and 48b therebetween so as to form a baling chamber 66 between the runs 48a. 48b which is bounded at the sides by the sidewalls 18,20.

Initially, the chamber 66 assumes a generally upright, somewhat triangular configuration, as shown in phantom lines in FIG. 1, with the retaining rollers 60, 62 at the apex of the chamber 66. Thereafter, the chamber 66 becomes distended and circular in transverse configuration as the growing bale pushes forwardly on the belt run 48a and rearwardly on the belt run 48b to cause additional slack to be paid out and for the arm 64 to rise as additional hay is progressively added to the bale.

The chamber 66 is open at the bottom to present a crop infeed entrance 68 that is defined between the support roll 46 and a starter roller 70. A crop pickup mechanism 72, supported generally below the entrance 66 and forwardly of the support roll 46, is operable to lift crop material off the field as the baler 10 is advanced and to feed the material into the chamber 66 via the entrance 68.

The drive rolls 28 and 30 are drivingly coupled with the power source of the towing vehicle to drive the belts 48 and are driven in clockwise directions viewing FIG. 1, as indicated by arrows 74 and 76, respectively. Thus, when the baling chamber 66 is in its initial upright condition, as shown in phantom in FIG. 1, the front run 48a is moving generally downwardly and forwardly while the rear run 48b is moving generally upwardly. Consequently, hay introduced into the chamber 66 via the entrance 68 is acted upon by the upwardly moving rear run 48b and the downwardly moving front run 48a so as to tumble forwardly and coil into a growing bale. Assisting in the initial starting of the core and the coil-up action is the starter roller 70 which is driven in a clockwise direction viewing FIG. 1, as indicated by arrow 78.

During the formation of the bale, which is illustrated in its final size in solid in lines in FIG. 1 and is denoted by the numeral 80, a small amount of hay is sloughed off the bale 80 due to slippage between the belts 48 and the surface of the bale 80, and some of that residue tends to collect within the open area above the roll 28 and forwardly of the front belt run 48a. However, such accumulating material is immediately discharged from that area by the action of the cleanout discs, broadly denoted by the numeral 82 in FIG. 1, which protrude into the collecting region and have their protruding portions moving downwardly in a direction oppositely to the upwardly moving belts 48 in that area. Such cleanout discs 82 are the subject of U.S. Pat. No. 5,097,760, entitled POWERED TRASH REMOVAL APPARATUS FOR ROUND BALER, assigned of record to the assignee of the present invention.

Once the bale 80 is fully formed, it is desirable that it be tightly wrapped with a web-type wrapper material such as a net material currently available from Exxon Chemical Company sold under the trade designation "Bale Lok" net wrap. The baler 10 is provided with an attachment in the form of apparatus 84 at the rear of the machine for dispensing net wrap or other similar wrapper material to the bale 80 at the appropriate time.

The wrapping apparatus 84 includes a housing 86 having a lower, stationary portion 86a and a hinged top portion 86b. Housing portions 86a,86b share a common rear wall 88 that spans the two sidewalls 18 of the baler in a horizontal direction and extends downwardly from the top of the top portion 86b to a point above the lower extremity of the bottom portion 86a whereby to define a net wrap outlet 90 in the vicinity of the lower tailgate roll 42.

As best shown in FIGS. 2 and 5, the lower housing portion 86a also has a pair of opposite, left arid right end walls 92 and 94, respectively, and a front wall 96 which spans the distance between the two end walls 92,94. The lower housing portion 86a is open along its top and bottom. The upper housing portion 86b also has a pair of opposite left and right end walls 98 and 100, respectively, a front wall 102 spanning the two end walls 98,100, an inclined top wall 104 interconnecting the walls 98, 100, and 102, and a horizontally extending bottom wall 106 which joins together the walls 98, 100, and 102 along their lower extremities. The bottom wall 106 stops short of the common rear wall 88 and is downturned at that location to present an opening 108 through which the wrapper may be discharged from the upper housing portion 86b in the manner hereinafter described. A horizontal hinge 110 interconnects the top housing portion 86b with the lower housing portion 86a generally along the intersection of the two front walls 96,102 whereby to permit the top housing portion 86b to be swung out of its closed, operative position illustrated in the figures and into a rearwardly swung down, loading position to facilitate loading of individual reels of wrapper material through the open area defined at the back of the top housing portion 86b when the latter is swung away from the common rear wall 88. Although not illustrated in detail, it will be appreciated that the apparatus is provided with a latch mechanism (not shown) for selectively maintaining the upper housing portion 86b in its closed, operative position.

The top housing portion 86b serves as a type of trough or holder for a cylindrical reel 112 of wrapper material. Although the reel 112 is contained within the internal cavity defined by the upper housing portion 86b and lies against upper and lower locating structures 114 and 116 at the front of the housing, the bottom wall 106 of the upper portion 86b of the housing, and the common wall 88 at the rear of the housing, such confinement does not prevent the web of wrapper material from being unwound from the reel 112 during use. In the preferred embodiment, the reel 112 is positioned within the top housing portion 86b in such a manner that the web unwraps from the reel 112 in a general clockwise direction viewing FIG. 5, the web passing along the bottom wall 106 from the reel 112, and thence downwardly through the opening 108 to the main part of the wrapping apparatus 84 as will now be described.

As illustrated perhaps best in FIG. 5, the wrapping apparatus 84 also generally includes a cutting mechanism 118 for severing the wrapper W and a feed device 120 for feeding the wrapper W from the reel of material 112 to the baling chamber 66. Turning initially to the cutting mechanism 118, each finished bale 80 is wrapped with a predetermined length of the wrapper material such that the mechanism 118 severs the wrapper W from the remainder of the reel 112 once the preselected length of the wrapper has been pulled from the reel 112. The preferred cutting mechanism 118 is similar in construction to the cutting mechanism disclosed in U.S. Pat. No. 5,216,873, entitled WRAPPER CUTOFF MECHANISM FOR ROUND BALERS, assigned of record to the assignee of the present invention; although the design of the mechanism may be varied as desired. It will be appreciated that cutting mechanisms are well known to those of ordinary skill in the art and form no part of the present invention, per se. Suffice it to explain the cutting mechanism 118 comprises a pair of cooperating components including an anvil 122 and a cutter 124. Preferably, the anvil 122 is stationary and the cutter 124 is movable toward and away from the anvil 122, although this arrangement could be reversed.

Particularly, the anvil 122 (see FIG. 5) comprises a long bar secured to a transverse bracket 126 that spans the end walls 92,94 of lower housing portion 86a. The anvil 122 is secured to the bracket 126 by a series of threaded fasteners 128 and is held in a level condition by the bracket 126 across and above the full width of the wrapper W on one side of the wrapper W as it travels between the feed device 120 and the outlet 90. The anvil 122 includes a tapered nose 130 which extends the full length of the anvil 122 so as to present a pair of inclined surfaces that converge outwardly generally toward the wrapper W. As illustrated in FIGS. 1 and 5, the nose 130 of the anvil 122 is spaced a distance back from the normal path of the wrapper W so that the nose 130 is normally out of contact with the wrapper W.

The other major component of the cutting mechanism 112 is the cutter 124 which is adapted to swing toward and away from the anvil 122. The cutter 124 includes a long tubular member 132 which is substantially the same length as the anvil 122, is disposed on the opposite side of the wrapper W from the anvil 122, and extends in parallel relationship to the anvil 122. The tubular member 132, which is annular in transverse cross section presents a circular outermost periphery, has a longitudinal slot 133 which runs the full length of the member 132 and is adapted to wedgingly receive the nose 130 of anvil 122 when the cutter 124 is swung to its fully operated position (not shown) in engagement with the anvil 122. Although not illustrated in detail, it will be appreciated that the intersection between slot 133 and the outer surface of the annular wall of the tubular member 132 present a pair of cutting edges along opposite extremities of the slot 133. Preferably, the anvil 122 and the cutter 124 are adjusted so that when the cutter 124 is in engagement with the anvil 122, either one of or both of the cutting edges strikes the respective inclined surfaces of the nose 130.

The fasteners 128 of the anvil 122 pass through elongated holes (not shown) in the bracket 126 which are oriented with their longer dimensions extending upwardly and rearwardly generally toward the feed device 120. Upon loosening the fasteners 128, the anvil 122 may thus be adjustably shifted up and down along the bracket 126 to adjust the level of contact between the inclined surfaces of the nose 130 and cutting edges of the cutter 124.

The cutter tube 132 is supported in its swinging movement toward and away from the anvil 122 by a pair of generally L-shaped, left and right hangers 134 and 136 (FIGS. 2 and 5), each hanger 134 or 136 having a horizontal portion thereof extending through an arcuate slot 138 or 139 in the corresponding end wall 92 or 94 and connected to the proximal end of the tubular member 132 via fasteners 140 (FIG. 5). The generally vertical portions of the hangers 134,136 extend upwardly along the outside of the lower housing portion 86a and are swingably connected at the upper ends thereof to their corresponding end walls 92,94 by bolt assemblies 141 (FIG. 2).

As best shown in FIG. 2, swinging of the cutter 124 between its operated and retracted positions is carried out by a pair of single acting hydraulic cylinders 142 and 144 positioned exteriorly of the left end wall 92 of the lower housing portion 86a. The hydraulic cylinder 142 is connected between the end wall 92 of the lower housing portion 86a and an upper extension of the left hanger 134 such that when the ram 142a of the cylinder 142 is extended as illustrated in FIG. 2, the left hanger 134, and hence the entire cutter 124, is caused to swing rightwardly into the retracted position of FIG. 5. On the other hand, for swinging the cutter 124 in the opposite direction into its operated position (not shown), the hydraulic cylinder 144 is similarly connected between the end wall 92 and the upper extension of the left hanger 134 such that when the ram 144a of cylinder 144 is extended, the hangers 134,136 are rocked in a direction to throw the cutter tube 132 into contact with the anvil 122. Of course, the right hanger 136 may also be coupled with a pair of cylinders for assisting the cylinders 142,144 in swinging the cutter 124 between its operated and retracted positions.

FEED DEVICE 120

As best shown in FIG. 5, situated within the lower housing portion 86a is a pair of feed rollers 146 and 148 which are positioned in contacting peripheral engagement with one another so that rotation of one of the rollers causes corresponding rotation of the other. Adjacent the ends of each of the feed rollers 146,148 is a bearing assembly 150 (only one such assembly being illustrated in FIG. 3) that is attached to the respective end walls 92,94 by bolt assemblies 152. Each bearing assembly 150 receives a corresponding stub shaft 154 projecting from each end of the feed rollers 146,148, whereby the rollers 146,148 are journaled for rotation by the end walls 92,94. Preferably, the feed rollers 146 and 148 are rubber-covered rollers such that their two peripheries press resiliently against one another in the formation of the feeding nip for the wrapper.

Returning to FIG. 5, slightly upstream from the feed rollers 146,148 is a single, free-wheeling spreader roller 156 that is not journaled by the sidewalls 92,94 of the lower housing portion 86a, but is instead supported between a pair of downwardly projecting rigid straps 158 (only one being illustrated) which are secured to the top housing portion 86b. The spreader roller 156 has its outer periphery provided with a double-acting helical vane 160 having a left hand lead at one end of the roller 156 and a right hand lead at the opposite end of the roller 156 such that the wrapper web engaging with the roller 156 tends to be spread out toward opposite ends of the roller 156 when the latter is rotated during linear advancement of the wrapper W. The spreader roller 156 extends substantially the full length of the feed rollers 146,148, and the wrapper web, after passing downwardly through the opening 108, is looped under the spreader roller 156 and thence up and over the feed roller 146 before passing downwardly through the nip defined between the feed rollers 146,148.

It is the function of the feed rollers 146,148 to receive the wrapper W therebetween and pay out wrapping material from the reel 112 during each wrapping cycle and to feed the wrapper down through the outlet 90 and along a downwardly and forwardly inclined ramp 162 to the crop intake entrance 68 of the baler. It will be seen by viewing FIG. 1 that the ramp 162 extends from the housing outlet 90 to a position just below the support roll 46 so as to provide a bottom support for the flimsy wrapping material as it is presented to the crop entrance 68. Preferably, the ramp 162 is defined by a metal pan 164, which is coextensive with the lower tailgate roll 42 and projects rearwardly from below the tailgate roll 42 into the lower housing portion 86a, and a series of flat, rigid, laterally spaced slats 166 (only one such slat being illustrated in FIGS. 1 and 5) or the like aligned with individual belts 48 along the bottom rear portion of the baler. As best shown in FIGS. 5 and 6, the pan 164 is supported by a laterally extending, L-shaped member 168 that is spring-biased generally toward the lower tailgate roll 42 by a leaf spring 170. In practice, the leaf spring 170 may be attached to the member 168 by suitable means, such as a pair of bolt assemblies 172, 174, and bears against a set of retaining tubes 176,178 (FIG. 6) for yieldably biasing the pan 164 into engagement with the belts 48 looped around the lower tailgate roll 42. In this respect, as the wrapper W flows downstream from the feed rollers 146,148, it is directed by the metal pan 164 into a nip defined between the pan and the belts 48, whereby the engagement with the belts 48 serves to advance the wrapper W forwardly. The slats 166 of the ramp 162 are spaced only slightly below the respective belts 48 so as to maintain engagement of the wrapper W with the moving belts 48 along the ramp 162.

Accordingly, the belts 48 move the wrapper W along a path of movement that is generally coextensive with the ramp 162. Once the wrapper is presented to the crop infeed opening 68, it is pulled around the support roller 46 by the belts 48 and inserted within the nip point between the bale 80 and the support roll 46. Such nip point is sufficiently aggressive as to grab the wrapper and feed it rearwardly and upwardly around the bale 80 in a counterclockwise direction viewing FIG. 1 as the rear run 48b of the belts 48 moves in such direction, thereby enveloping the finished bale with complete convolutions of the wrapper.

The improved feed device 120 includes a drive, broadly denoted by the numeral 190, which supplies power to the feed rollers 146,148 via a shaft 182 associated with lower rear tailgate roll 42, which fixedly carries a drive sheave 184 protectively interposed between the exterior of the left sidewall 18 of the baler 10 and a detachable cover plate 185. The drive sheave 184 is entrained by an endless drive belt 186 that is also looped around a relatively larger driven sheave 187 associated with the feed roller 146. A pair of elongated guide members 189 (see FIG. 3) are connected to the rear wall 88 of the housing 86 and disposed on opposite sides of the belt 186 for preventing the belt 186 from slipping off of the sheaves 184,187 when it is slackened. Although the drive sheave 184 may be rotating most of the time because of the corresponding rotation of the lower tailgate roll 42, the feed roller 146 will not be rotating unless the belt is tensioned. An idler clutch sheave 188 rotatably carried by the lower end of the left hanger 134 sufficiently tensions the belt 186 to drivingly connect the driven sheave 187 with the drive sheave 184 when the cutter 124 is positioned in its fully retracted position, as illustrated in FIG. 2. At other times, when the cutter 124 is in its operated position (not shown), the clutch sheave 188 allows the drive belt 186 to slacken, so as to drivingly disconnect the driven sheave 187 from the drive sheave 184. If desired a brake (not shown) may be provided to ensure that the feed rollers 146, 148 cease rotating once the cutter 124 swings to its operated position.

It will be appreciated that the lower tailgate roll 42 rotates in a clockwise direction viewing FIG. 5 such that when the feed roller 146 is drivingly connected to the tailgate roll 42, the feed roller 146 rotates in a clockwise direction. Additionally, as previously described, because of the peripheral engagement of the feed rollers 146, 148, rotational movement of one of the feed rollers is imparted to the other such that when the feed roller 146 is driven, the feed roller 148 rotates in a counter-clockwise direction viewing FIG. 5.

Turning particularly to the drive sheave 184, the sheave 184 is fixedly coupled with the shaft 182 of the lower tailgate roll 42 by suitable means, such as the retaining collar 192 and threaded screw 193 best depicted in FIG. 3. Preferably, the drive sheave 184 is configured to reduce the speed at which the feed rollers 146,148 pull the wrapper from the reel 112 to one-half of the belt speed. Thus in the illustrated embodiment, the drive sheave 184 is approximately one-half the diameter of the driven sheave 187 so that the angular velocity of the lower tailgate roll 42 is approximately two times the angular velocity of the feed roller 146. With the feed roller 146 and lower rear tailgate roll 42 having substantially similar cross-sectional diameters, the peripheral speed of the feed rollers 146, 148 is approximately one-half the peripheral speed of the tailgate roll 42. It has been determined that this reduction in the feed rate prevents the wrapper W from back-wrapping onto the feed rollers 146,148.

Moreover, an overrunning clutch, generally referenced by the number 194, intercouples the drive 190 and the feed rollers 146, 148 so as to prevent stretching of the wrapper W when the belts 48 advance the wrapper faster than the rate at which the feed rollers 146,148 are pulling the wrapper from the reel 112. That is to say, if the stationary surfaces of the metal pan 164 or slats 166 do not cause a significant amount of slippage between the belts 48 and wrapper W along its path of movement or, once the wrapper W reaches the baling chamber 66 and is aggressively pulled by the belts 48, the clutch 194 drivingly disconnects the feed rollers 146, 148 from the lower tailgate roll 42 so that wrapper may be pulled from the reel 112 by the belts. Accordingly, a construction is provided that prevents back-wrapping of the wrapper W onto the feed rollers 146,148, while allowing the wrapper to be paid out at rates faster than the feed rollers 146,148 pull the wrapper from the reel 112 so as to eliminate stretching of the wrapper.

The clutch 194 is preferably constructed as a ratchet-type or dog-type clutch, although other clutch constructions are within the ambit of the present invention. As best shown in FIG. 4, the clutch 194 includes a ratchet wheel 196 having a hollow, extended hub portion 198 surrounded by a generally annular cavity 200. The wheel 196 has a plurality of circumferentially spaced grooves 202 which are defined along the outer boundary of the cavity 200. The hub 198 of the ratchet wheel 196 is received on the stub shaft 154 projecting from the left end of the feed roller 146 and is secured thereto by a washer 204 and a screw 206 threadably received within a bore (not shown) extending axially inwardly from the end of shaft 154. A rectangular key 208 is received within keyways 210 and 212 cut within the hub portion 198 and the shaft 154, respectively, so that rotational movement of the ratchet wheel 196 corresponds with rotational movement of the feed roller 146, and vice versa. The driven sheave 187 is received onto the hub portion 198 of the wheel 196 and is removably retained thereon by a snap ring 214 set within a notch 216 extending along the circumference of the hub portion. A bushing 218 is press-fit within the central opening 220 of the driven sheave 187 for allowing relative rotational movement between the sheave 187 and the ratchet wheel 196. Finally, a driving pawl 222 is pivotally secured to the outboard side of the driven sheave 187 by a pin 224 and is positioned for engagement with the grooves 202 of the ratchet wheel 196.

Each of the grooves 202 present a locking surface 202a, against which the pawl 222 abuttingly engages when pivoted into a drive position (illustrated in FIG. 2), whereby rotational movement of the sheave 187 is imparted to the ratchet wheel 196. It will be appreciated that as the driven sheave 187 is rotated in the clockwise direction viewing FIG. 2, centrifugal force pivots the pawl 222 into the drive position, whereby the clutch 194 is engaged. Accordingly, with the pawl 222 in its drive position and the cutter 124 in its retracted position so that driving power is supplied to the driven sheave 187 via the drive belt 186, the feed rollers 146,148 are drivingly connected with the drive so that they rotate in directions (i.e., roller 146 rotating clockwise and roller 148 rotating counterclockwise viewing FIG. 2) to pull the wrapper W from the reel 112. The grooves 202 also present camming surfaces 202b which successively pivot the pawl 222 out of the drive position as the ratchet wheel 196 rotates faster in the clockwise direction (viewing FIG. 2) than the driven sheave 187, whereby the clutch is disengaged. Accordingly, when the wrapper W is pulled by the belts 48 at speeds which are faster than the speed at which the feed rollers 146,148 pull the wrapper from the reel 112, the wrapper urges the feed rollers to rotate faster, which in turn rotates the ratchet wheel 196 faster than the driven sheave 187. In this respect, the feed rollers 146, 148 are essentially freely rotatable when the clutch 194 is disengaged so that the belts 48 may pull the wrapper W from the reel 112.

A prior art arrangement is illustrated in FIG. 7, with a conventional drive for coupling the feed rollers (not shown in FIG. 7) with the lower tailgate roll (also not shown in FIG. 7) being denoted by the numeral 226. The drive 226 generally includes a driven sheave 228 directly fixed to the shaft 230 of the slightly elevated feed roller, a drive sheave 232 attached to the shaft 234 of the lower rear tailgate roll, and a belt 236 selectively drivingly connecting the sheaves 228,232 in the manner described hereinabove. As depicted in FIG. 7, the drive sheave 232 is only slightly smaller in diameter than the driven sheave 228.

It will be appreciated that in the prior art embodiment, the diametrical sizes of the feed roller and the lower tailgate roll are substantially similar, such that the peripheral speeds of the feed rollers are substantially similar to the peripheral speed of the lower tailgate roll. Although this design attempts to prevent stretching of the wrapper by driving the feed rollers so that they pull the wrapper from the reel at the same speed at which the belts are moving, it is still problematic. As previously described, when the wrapper initially advances along the ramp (not shown in FIG. 7), the frictional engagement with the non-moving surfaces of the ramp prevents the wrapper from being advanced by the belts at the same speed at which the belts are moving. Accordingly, the feed rollers are pulling the wrapper from the reel at a rate faster than the speed at which the belts are able to advance the wrapper along its path of movement. Under these circumstances, the wrapper web has a tendency to bunch up downstream from the feed rollers, and as the feed rollers continue to rotate, the web has a tendency to re-wrap itself back onto the rollers. However, once the wrapper reaches the baling chamber, the belts tend to pull the wrapper at speeds nearer the speed of the belts. Consequently, as the belts pull the wrapper at speeds faster than the speed at which the wrapper is paid out by the feed rollers, the wrapper tends to stretch.

OPERATION

The general mode of operation of the baler 10 should be apparent from the foregoing description. Suffice it, therefore, to explain that a relatively small core of crop material begins tumbling forwardly within the empty baling chamber 66 at the commencement of a baling cycle as a result of the upwardly moving rear belt runs 48b and the generally downwardly and forwardly moving front belt runs 48a. As crop material continues to be picked up from the field and introduced into the chamber 66 through the open entrance 68, the core starts to grow in size and expands against the yieldable resistance offered by the belts 48. The bale continues to grow and the belts 48 continue to expand while rotating the bale until the bale 80 finally reaches its full size as indicated in FIG. 1. During this period of bale formation, the wrapper apparatus 84 is in the standby position (not shown); i.e., with the cutter 124 in the operated position. The feed rollers 146,148 are idle at this time, although the drive sheave 184 in FIGS. 2 and 3 has been continuously rotating.

As the bale 80 roaches full size, such condition is appropriately sensed by means not illustrated and either signaled to the operator for manual activation of the wrapping cycle, or automatically signaled to the wrapping apparatus 84 to commence wrapping of the bale 80. The baler is stopped in its forward progress at this time. As will be seen, because the wrapper is introduced into the baling chamber 66 adjacent the lower rear portion thereof and is subsequently wrapped around the bale in a counterclockwise direction viewing FIG. 1, the wrapper does not cross and block the crop entrance 68 until near the end of a complete revolution of the bale 80. Therefore, crop inflow need not be terminated until just before the wrapper crosses the entrance 68.

In any event, as the signal to start the wrap cycle is received by the apparatus 84, oil under pressure is supplied to the cylinder 142 in FIGS. 6 and 7 to extend its ram 142a and thus cause the hangers 134,136 and the cutter 124 to be swung into the retracted position, as illustrated in FIGS. 2 and 5. This causes the clutch idler sheave 188 to come into tight engagement with the previously loose drive belt 186 and tighten the same about the drive sheave 184 such that driving power from the drive sheave 184 is transmitted to the driven sheave 187 by the belt 186. As driven sheave 187 starts to rotate, the pawl 222 pivots into the drive position, thereby engaging the clutch 194 and causing corresponding rotation of the feed roller 146. Rotation of the feed roller 146 in turn causes rotation of the companion feed roller 148 in view of the contacting interengagement of the two rollers, thus feeding the wrapper W downwardly between the separated cutter 124 and anvil 122 and into and through the outlet 90 onto the ramp 162, as illustrated in FIG. 5.

Initially, the belts 48 advance the wrapper W along its path of movement typically at speeds which are less than the speed of the belts because of the slippage caused by the frictional interengagement between the wrapper and the stationary surfaces of the metal pan 164 and slats 166. However, the belts 48 may advance the wrapper W along its path at speeds which are greater than the speed at which the feed rollers 146,148 pull the wrapper from the reel 112. In this situation, the belts 48 pull the wrapper W so that the feed rollers 146,148, and therefore the ratchet wheel 196, are rotated faster than the driven sheave 187. The relative movement between the ratchet wheel 196 and driven sheave 187 results in the camming surfaces 202a of the grooves 202 successively pivoting the pawl 222 out of the drive position, thereby disengaging the clutch 194. The freely rotatable feed rollers 146,148 allow the belts 48 to pull the wrapper W from the reel so that it is not stretched. Engagement and disengagement of the clutch 194 may occur several times as the wrapper W initially advances down the ramp 162. Once the wrapper reaches the baling chamber 66 and is aggressively grabbed by the nip between the bale 80 and belts 48, the belts again pull the wrapper at a speed which is higher than the speed at which the driven feed rollers 146, 148 pull the wrapper from the reel 112, thereby disengaging the clutch 194.

Preferably, the wrapper encircles the bale at least 2 to 2 ½ times, depending upon personal preferences. A control mechanism, which forms no part of the present invention per se and is therefore not illustrated or described in detail, is provided for operating the wrapping apparatus 84 for a period of time that will produce a length of wrapper corresponding to the number of wraps desired to be placed around the bale 80. When this period of time has elapsed, the hydraulic cylinder 144 is operated to extend its ram 144a, causing the hangers 134,136 to swing toward the anvil 122, slackening the drive belt 186 and thus disconnecting the feed rollers 146,148 from driving power. This action also has the effect of severing the wrapper W. Particularly, as the cylinder 144 is extended from its FIG. 2 position, the cutter 124 is swung left-wardly from its FIG. 5 position into engagement with the wrapper W and toward the anvil 122. Although the wrapper W is moving linearly at this time, the arcuate surface of the cutter tube 132 protects the wrapper W from snagging engagement with either of the cutting edges of the tube so that the wrapper W simply slides smoothly across the outer surface of the cutter tube 132, even though the wrapper W is deflected laterally out of its normal path of travel. Then, as the cutter tube 132 approaches the anvil 122 and the nose 130 enters the slot 133, the wrapper W is forced into the slot 133 along with the nose 130 and is caused to become progressively clamped between the cutting edges defined by the slot 133 and the nose 130. Ultimately, either one or both of the cutting edges effects severance of the wrapper W.

Following severance of the wrapper, rotation of the bale 80 may be terminated and the tailgate 26 is raised to discharge the completed and wrapped bale. Hydraulic means for opening the rear of the baler are not illustrated herein, but are well understood by those skilled in the art.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the present invention may be utilized with a cutting mechanism or feed roller drive other than those illustrated and described herein.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. In a round baler having a bale forming mechanism that cooperatively defines a baling chamber within which successive bales of crop material are formed and wrapped with individual lengths of wrapper material cut from a reel of the material, wherein the bale forming mechanism is operable to pull the wrapper from the reel at a speed during wrapping of the bale, an improved feed device for feeding the wrapper from the reel to the chamber comprising:

a pair of feed rollers receiving the wrapper therebetween and drivable in directions to pull the wrapper from the reel for presentation to the chamber;

a drive coupled with the feed rollers for driving the rollers at velocities which pull the wrapper from the reel at a speed relatively less than the speed at which the wrapper is pulled from the reel by the bale forming mechanism during wrapping of the bale, said drive including a reducer assembly drivingly coupling said feed rollers with the bale forming mechanism; and an overrunning clutch intercoupling the drive and the feed rollers, said feed rollers being drivingly connected to the drive when the clutch is engaged and drivingly disconnected from the drive when the clutch is disengaged, said feed rollers being freely rotatable when the clutch is disengaged for allowing the wrapper to be pulled off the reel by the bale forming mechanism.

2. In a round baler as claimed in claim 1, said reducer assembly including a drive sheave coupled with the bale forming mechanism such that the drive sheave rotates during operation of the mechanism, a driven sheave coupled with the clutch, said driven sheave being relatively larger than the drive sheave, and an endless belt which drivingly connects the driven sheave to the drive sheave when under tension.

3. In a round baler as claimed in claim 2, said overrunning clutch including a ratchet wheel fixed to one of the feed rollers for rotational movement therewith, said ratchet wheel including a plurality of circumferentially spaced grooves, each having a locking surface, and a pawl supported on the driven sheave for pivotal movement into and out of a drive position, in which the pawl abuttingly engages one of the locking surfaces for drivingly connecting the feed rollers and the drive, said feed rollers being drivingly disconnected from the drive when the pawl is pivoted out of the drive position.

4. In a round baler as claimed in claim 3, said grooves including camming surfaces which successively pivot the pawl out of the drive position as the ratchet wheel rotates relatively faster than the driven sheave.

5. In a round baler as claimed in claim 1, said overrunning clutch including a ratchet wheel fixed to one of the feed rollers for rotational movement therewith, said ratchet wheel including a plurality of circumferentially spaced grooves, each having a locking surface, and a pawl supported on the drive for pivotal movement into and out of a drive position, in which the pawl abuttingly engages one of the locking surfaces for drivingly connecting the feed rollers and the drive, said feed rollers being drivingly disconnected from the drive when the pawl is pivoted out of the drive position.

6. In a round baler having a bale forming mechanism that cooperatively defines a baling chamber within which successive bales of crop material are formed and wrapped with individual lengths of wrapper material, wherein the bale forming mechanism is operable to pull the wrapper at a speed during wrapping of the bale, an improved wrapper apparatus comprising:

structure for housing a reel of the wrapper material and for allowing the wrapper to be paid out as the bale is being wrapped;

a pair of feed rollers receiving the wrapper therebetween and drivable in directions to pull the wrapper from the reel for presentation to the chamber;

cutting mechanism for severing the wrapper into the individual lengths;

a drive coupled with the feed rollers for driving the rollers at velocities which pull the wrapper from the reel at a speed relatively less than the speed at which the wrapper is pulled from the reel by the bale forming mechanism during wrapping of the bale, said drive including a reducer assembly drivingly coupling said feed rollers with the bale forming mechanism; and an overrunning clutch intercoupling the drive and the feed rollers, said feed rollers being drivingly connected to the drive when the clutch is engaged and drivingly disconnected from the drive when the clutch is disengaged, said feed rollers being freely rotatable when the clutch is disengaged for allowing the wrapper to be pulled off the reel by the bale forming mechanism.

7. In a round baler as claimed in claim 6, said reducer assembly including a drive sheave coupled with the bale forming mechanism such that the drive sheave rotates during operation of the mechanism, a driven sheave coupled with the clutch, said driven sheave being relatively larger than the drive sheave, and an endless belt which drivingly connects the driven sheave to the drive sheave when under tension.

8. In a round baler as claimed in claim 7, said overrunning clutch including a ratchet wheel fixed to one of the feed rollers for rotational movement therewith, said ratchet wheel including a plurality of circumferentially spaced grooves, each having a locking surface, and a pawl supported on the driven sheave for pivotal movement into and out of a drive position, in which the pawl abuttingly engages one of the locking surfaces for drivingly connecting the feed rollers and the drive, said feed rollers being drivingly disconnected from the drive when the pawl is pivoted out of the drive position.

9. In a round baler as claimed in claim 8, said grooves including camming surfaces which successively pivot the pawl out of the drive position as the ratchet wheel rotates relatively faster than the driven sheave.

10. In a round baler as claimed in claim 6, said overrunning clutch including a ratchet wheel fixed to one of the feed rollers for rotational movement therewith, said ratchet wheel including a plurality of circumferentially spaced grooves, each having a locking surface, and a pawl supported on the drive for pivotal movement into and out of a drive position, in which the pawl abuttingly engages one of the locking surfaces for drivingly connecting the feed rollers and the drive, said feed rollers being drivingly disconnected from the drive when the pawl is pivoted out of the drive position.

11. In a round baler, the improvement comprising:

a series of transverse rolls and a plurality of laterally spaced belts entraining said rolls, said rolls and belts cooperatively defining a baling chamber within which successive bales of crop material are formed and wrapped with individual lengths of wrapper material, said belts being disposed for advancing the lengths of wrapper at a speed along a path of movement extending to the baling chamber;

structure for housing a reel of the wrapper material and for allowing the wrapper to be paid out as the bale is being wrapped;

a pair of feed rollers receiving the wrapper therebetween and drivable in directions to pull the wrapper from the reel for presentation to the path of movement;

cutting mechanism for severing the wrapper into the individual lengths;

a drive coupled with the feed rollers for driving the rollers at velocities which pull the wrapper from the reel at a speed relatively less than the speed at which the wrapper is advanced along its path of movement by the belts, said drive including a reducer assembly drivingly coupling said feed rollers with one of the rolls; and an overrunning clutch intercoupling the drive and the feed rollers, said feed rollers being drivingly connected to the drive when the clutch is engaged and drivingly disconnected when the clutch is disengaged, said feed rollers being freely rotatable when the clutch is disengaged for allowing the wrapper to be pulled off the reel by the belts during wrapping of the bale.

12. In a round baler as claimed in claim 11, said one roll and the feed rollers having generally equal diameters, whereby the angular velocities of the feed rollers are relatively less than the angular velocity of said one roll.

13. In a round baler as claimed in claim 11, said reducer assembly including a drive sheave coupled with said one roll such that the drive sheave rotates therewith, a driven sheave coupled with the clutch, said driven sheave being relatively larger than the drive sheave, and an endless belt which drivingly connects the driven sheave to the drive sheave when under tension.

14. In a round baler as claimed in claim 13, said overrunning clutch including a ratchet wheel fixed to one of the feed rollers for rotational movement therewith, said ratchet wheel including a plurality of circumferentially spaced grooves, each having a locking surface, and a pawl supported on the driven sheave for pivotal movement into and out of a drive position, in which the pawl abuttingly engages one of the locking surfaces for drivingly connecting the feed rollers and the drive, said feed rollers being drivingly disconnected from the drive when the pawl is pivoted out of the drive position.

15. In a round baler as claimed in claim 14, said grooves including camming surfaces which successively pivot the pawl out of its drive position as the ratchet wheel rotates relatively faster than the driven sheave.

16. In a round baler as claimed in claim 11, said overrunning clutch including a ratchet wheel fixed to one of the feed rollers for rotational movement therewith, said ratchet wheel including a plurality of circumferentially spaced grooves, each having a locking surface, and a pawl supported on the drive for pivotal movement into and out of a drive position, in which the pawl abuttingly engages one of the locking surfaces for drivingly connecting the feed rollers and the drive, said feed rollers being drivingly disconnected from the drive when the pawl is pivoted out of the drive position.

17. In a round baler comprising:

a bale forming mechanism cooperatively defining a baling chamber within which successive bales of crop material are formed during a baling cycle and subsequently wrapped with individual lengths of wrapper material;

structure for housing a reel of the wrapper material and for allowing the wrapper to be paid out as the bale is being wrapped;

a stationary surface extending between the reel and the baling chamber, said bale forming mechanism and the surface defining a wrapper path therebetween, with the mechanism being operable to advance the lengths of wrapper at a speed along the path and into the chamber;

a pair of feed rollers receiving the wrapper therebetween and drivable in directions to pull the wrapper from the reel for presentation to the path;

a drive continuously supplying driving power to the feed rollers during the wrapping cycle, with the rollers being driven at velocities which pull the wrapper from the reel at a speed relatively less than the speed at which the wrapper is advanced along the path by the bale forming mechanism; and an overrunning clutch intercoupling the drive and the feed rollers, said feed rollers being drivingly connected to the drive when the clutch is engaged and disconnectable from the drive by the wrapper at times when the forming mechanism pulls the wrapper from the reel at a faster speed than the rollers.

18. In a round baler as claimed in claim 17, said bale forming mechanism comprising a series of transverse rolls and a plurality of laterally spaced belts entraining said rolls and having runs extending along said path.

19. In a round baler as claimed in claim 18, said belts being positioned above the stationary surface.

20. In a round baler as claimed in claim 19, said stationary surface including a plurality of laterally spaced, generally fore-and-aft extending slats.

21. In a round baler as claimed in claim 20, each of said belts being positioned above a corresponding one of said slats.

22. In a round baler as claimed in claim 18, said drive including a reducer assembly drivingly coupling said feed rollers with one of the rolls.

23. In a round baler as claimed in claim 22, said reducer assembly including a drive sheave coupled with said one roll such that the drive sheave rotates therewith, a driven sheave coupled with the clutch, said driven sheave being relatively larger than the drive sheave, and an endless belt which drivingly connects the driven sheave to the drive sheave when under tension.

24. In a round baler as claimed in claim 23, said overrunning clutch including a ratchet wheel fixed to one of the feed rollers for rotational movement therewith, said ratchet wheel including a plurality of circumferentially spaced grooves, each having a locking surface, and a pawl supported on the driven sheave for pivotal movement into and out of a drive position, in which the pawl abuttingly engages one of the locking surfaces for drivingly connecting the feed rollers and the drive, said feed rollers being drivingly disconnected from the drive when the pawl is pivoted out of the drive position.

25. In a round baler as claimed in claim 24, said grooves including camming surfaces which successively pivot the pawl out of its drive position as the ratchet wheel rotates relatively faster than the driven sheave.

26. In a round baler as claimed in claim 25, said belts being positioned above the stationary surface.

27. In a round baler as claimed in claim 26, said stationary surface including a plurality of laterally spaced, generally fore-and-aft extending slats.

28. In a round baler as claimed in claim 27, each of said belts being positioned above a corresponding one of said slats.

* * * * *